United States Patent
Raikar (10) Patent No.: US 8,577,044 B2
(45) Date of Patent: *Nov. 5, 2013

(54) METHOD AND APPARATUS FOR AUTOMATIC AND SECURE DISTRIBUTION OF AN ASYMMETRIC KEY SECURITY CREDENTIAL IN A UTILITY COMPUTING ENVIRONMENT

(75) Inventor: Amit Raikar, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2116 days.

This patent is subject to a terminal disclaimer.

(21) Appl. No.: 11/262,131

(22) Filed: Oct. 28, 2005

(65) Prior Publication Data

US 2007/0098178 A1 May 3, 2007

(51) Int. Cl.
*H04L 9/08* (2006.01)

(52) U.S. Cl.
USPC ............... 380/279; 380/278; 713/168; 726/5

(58) Field of Classification Search
USPC ............ 726/5; 380/277–279; 713/141; 709/201–203; 712/28–31
See application file for complete search history.

(56) References Cited

U.S. PATENT DOCUMENTS

| | | | | |
|---|---|---|---|---|
| 7,284,123 | B2* | 10/2007 | Kim | 713/163 |
| 2002/0099937 | A1* | 7/2002 | Tuomenoksa | 713/153 |
| 2005/0055306 | A1* | 3/2005 | Miller et al. | 705/37 |
| 2006/0080389 | A1* | 4/2006 | Powers et al. | 709/203 |
| 2006/0285693 | A1* | 12/2006 | Raikar | 380/278 |
| 2007/0033397 | A1* | 2/2007 | Phillips, II et al. | 713/168 |

* cited by examiner

*Primary Examiner* — Minh Dinh (57) ABSTRACT

Embodiments of the invention provide a method and an apparatus for automatic, secure, and confidential distribution of an asymmetric key security credential in a utility computing environment. In one method embodiment, the present invention provides an asymmetric key at a management server, the asymmetric key automatically associated with a logical device identifier of a provisionable resource. Additionally, an isolated virtual network is established between the management server and the provisionable resource for providing the asymmetric key to the provisionable resource. Then, after the asymmetric key is provided to the provisionable resource the isolated virtual network between the management server and the provisionable resource is dissolved.

30 Claims, 5 Drawing Sheets

METHOD AND APPARATUS FOR AUTOMATIC AND SECURE DISTRIBUTION OF AN ASYMMETRIC KEY SECURITY CREDENTIAL IN A UTILITY COMPUTING ENVIRONMENT

TECHNICAL FIELD

The present invention generally relates to utility computing environments. More specifically to a system and method for automatic, secure, and confidential distribution of an asymmetric key security credential in a utility computing environment.

BACKGROUND ART

Modern networking continues to provide an improvement in communication and information access. As an example, in-house data centers, associated with a particular entity or interrelated group of users, could contain a large number of information technology (IT) resources that are interconnected through a network. These networks are configured in different ways depending on implementation-specific details such as the hardware used and the physical location of the equipment, and depending on the particular objectives of the network. One common type of network configuration is a local area network (LAN). In actual practice, a typical LAN will include large numbers of computer systems, switches, routers, load balancers, firewalls, and the like.

In one embodiment, a LAN is established and/or managed by having a technician physically connecting devices according to a network plan. That is, when a plurality of resources is to be used in a network, the technician will connect the devices physically and install the correct software into the devices by hand. Each time a modification to the network or software is necessary, the technicians must manually connect or disconnect the devices or manually install or change the software to perform the modification.

To resolve the manual modification process, many modern networks also have in-house data centers which include technicians working from a network operation center (NOC). The technicians issue commands to control the deployment of servers and to control the supporting infrastructures, such as disk logical units (LUNs) in a disk array, network switches in the LAN, and the like. For example, a technician in the NOC may organize a virtual LAN (VLAN) including a plurality of the resources within the LAN network. In some cases, the collection of computational devices contained in these VLANs is referred to as farms. The network is referred to as a VLAN because the actual network (e.g., the wiring, cables, etc.) is not reconfigured, instead, the technicians in the NOC will virtually assign (e.g., with the use of software) the components specific to the VLAN. Thus, the physical network remains the same, but the actual utilization of the network can be divided into distinct LANs virtually.

For example, a user may request a farm including a server, a LUN, and two ports on a network switch. The technician in the NOC then inputs the request into a utility controller. The utility controller will automatically configure and deploy the computational devices to establish a farm of devices for the user. The user's farm would then be active as long as the user requested it and/or utilized it. After the user was finished with the farm, the technician in the NOC would input the cancel request into the utility controller and the resources would be reabsorbed into the resource pool to await reassignment. Therefore, by utilizing the NOC and the resources available in the LAN, a plurality of VLANs can be established without rewiring the network.

However, in a utility computing environment, like most other complex IT environments, for the secure use of applications it is prudent to uniquely be able to authenticate every managed node with a unique authentication credential. In most IT environments, for a secure framework, the setting up of authentication credentials is performed manually by at least one technician and therefore requires physical access. The applications themselves, although able to provide most of the authentication structure, are unable to provide an automated manner to distribute the initial authentication credentials in a secure manner. In static IT environments, this manual process is utilized because it is only a one-time setup cost. However, utility computing environments, as described herein, are allocated dynamically. Moreover, the resources may not have any local storage but instead be dynamically associated with storage allocated on a storage array network (SAN), and the entire resource allocation and setup process is automated. Therefore, it is impractical to use a manual approach of credential distribution and setting up of authentication schemes used for normal IT environments in a utility computing environment.

DISCLOSURE OF THE INVENTION

Embodiments of the invention provide a method and an apparatus for automatic, secure, and confidential distribution of an asymmetric key security credential in a utility computing environment. In one method embodiment, the present invention provides an asymmetric key at a management server, and the asymmetric key is automatically associated with a logical device identifier of a provisionable resource. Additionally, an isolated virtual network is established between the management server and the specific provisionable resource for providing the asymmetric key to that specific provisionable resource. Then, after the asymmetric key is provided to the provisionable resource the isolated virtual network between the management server and the provisionable resource is dissolved.

Another embodiment of the invention provides a method and an apparatus for provisionable resources in a utility computing environment to be able to authenticate other provisionable resources based on their logical identity, and also setup shared encryption credentials in a confidential and secure manner, for enabling direct secure communication between those two resources.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

OVERVIEW

Embodiments of the distribution of asymmetric key security credential provide an automated method and apparatus for securely distributing an asymmetric key (e.g., a public-private key pair) to the managed nodes in a utility computing environment. Embodiments further provide a framework that is utilized for the secure setup of other infrastructure authentication and shared credential schemes at any time during the lifetime of a managed node resource. Embodiments also provide identity and credential management issues related to utility computing features such as snapshot (e.g., farm duplication) or replacing failed devices.

Presently, numerous utility computing environments exist, one of those, for example, is the utility data center (UDC) available from Hewlett-Packard of Palo Alto, California. Although such a specific implementation will be mentioned herein, it should be understood that embodiments of the present invention are also well suited to use with various other utility computing environments. The present description begins with an overview of such an environment. The details of the automatic, secure, and confidential distribution of the asymmetric key security credential are then described in further detail.

In general, a public-private key pair provides the capability for an encryption from one key (e.g., the public key) to be unencrypted by only the other key (e.g., the private key) and vice-versa. For example, an authentication will start with a private key encryption of data from a first device, such as, the name of the first device. A second device receiving the encrypted message from the first device will utilize the first device's public key to decrypt the message, e.g., the name of the first device. The second device will then respond with confidential information (possibly including the public-key of the second device, any type of certificate, a password, or the like) encrypted in the first device's public key that requires the private key of the first device for decryption. Therefore, the second device ensures that it is only communicating with the first device. In one embodiment, it is after the initial handshake (e.g., the public key private key decryption process described above), that the first and second devices swap symmetric keys (e.g., passwords or other encryption credentials) for later authentication purposes.

Figure 1:
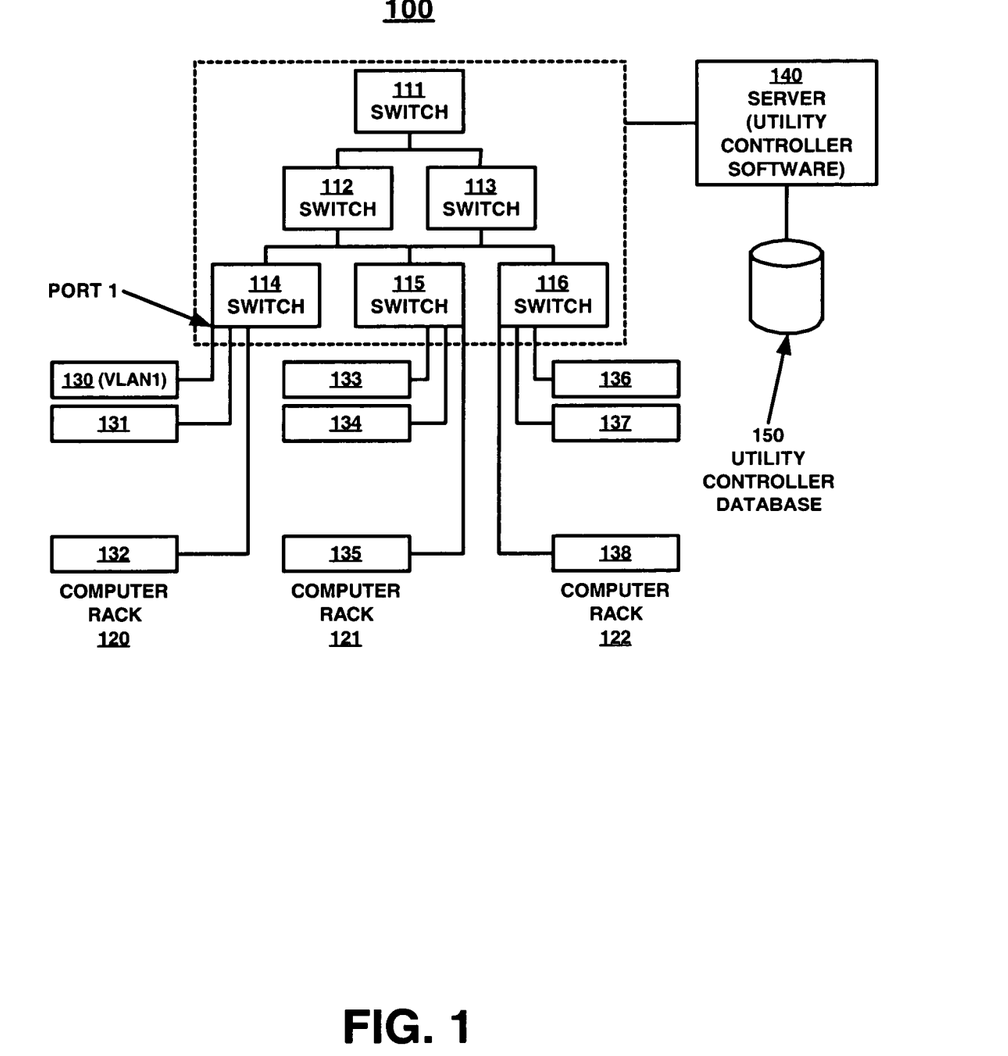
FIG. 1 is a block diagram of an exemplary LAN upon which embodiments of the present invention can be implemented.

With reference now to FIG. 1, a block diagram of an exemplary local area network (LAN) 100 is shown in accordance with embodiments of the present invention. It is appreciated that LAN 100 can include elements in addition to those shown (e.g., more racks, computers, switches and the like), and can also include other elements not shown or described herein. Furthermore, the blocks shown by FIG. 1 can be arranged differently than that illustrated, and can implement additional functions not described herein. Although a LAN is described herein, embodiments of the present invention are well suited for utilization with other types of networks. For example, in one embodiment, the utility computing environment includes a storage array. In another embodiment, the utility computing environment also includes a storage area network (SAN). In yet another embodiment, the utility computing environment includes a LAN, a SAN and a storage array. The present FIG. 1 is merely one of a plurality of possible network configurations that are within the scope of the utility computing environment shown for purposes of clarity.

In the present embodiment, LAN 100 includes a number of switches 111 through 116, and a number of computers 130-138 that are coupleable to the switches 111-116. Typically, the computers 130-138 are stored in computer racks 120, 121 and 122, although this may not always be the case. In this embodiment, the switches and computer systems are shown as being interconnected using cables or the like. However, wireless connections between devices in LAN 100 are also contemplated.

In one embodiment, the switches 111-116 are capable of being programmed or configured such that LAN 100 is logically separated into a number of VLANs. The programming or configuring of these switches can be changed, thereby changing the resources allocated to the various VLANs. For example, by changing the configuration of switch 114, computer system 130 can be "virtually moved" from one VLAN to another. The allocation and reallocation of resources between VLANs is one of the valuable operations performed after the actual physical building of the network structure.

In addition to computer systems and switches, LAN 100 can include other types of devices such as, but not limited to, routers, load balancers, firewalls, and hubs. These other types of devices may also be programmable or configurable.

The term "configurable device" is used herein to refer to devices that can be programmed or configured. The term "configuration information" is used herein to refer to information that describes the configuration of a configurable device. In one embodiment, the computer-readable network map need not exist in the form conventionally associated with human-readable maps. Furthermore, a network map may include information such as the types of devices in the LAN and a representation of each VLAN. Other information included in a network map includes, but is not limited to: the network or MAC (media access control) address for the resources of the LAN; the port numbers of the configurable devices; the VLAN identifiers associated with each of the port numbers; the socket identifier for each cable connected to each of the resources of LAN; manufacturer and model numbers; and serial numbers.

Figure 2:
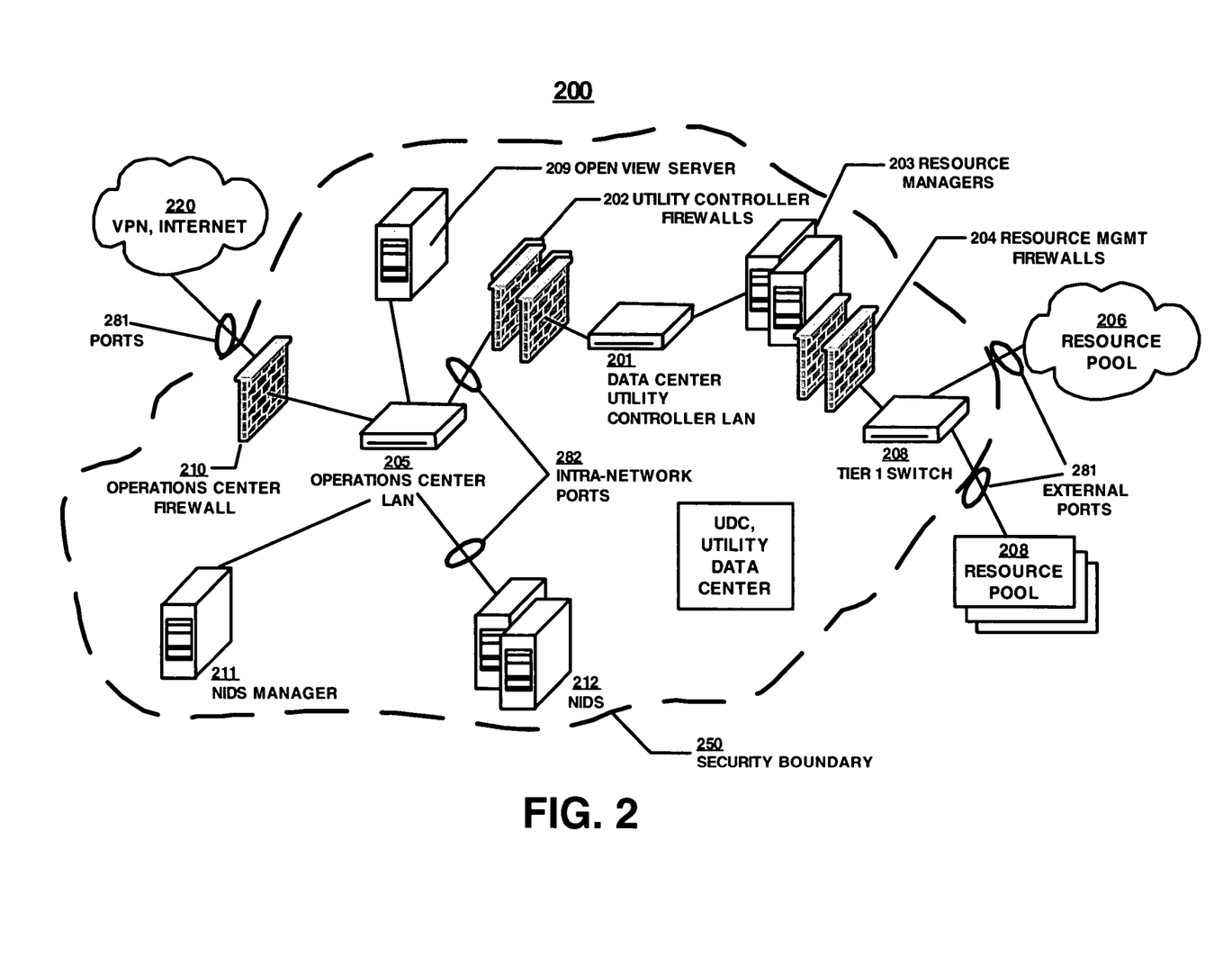
FIG. 2 is a block diagram of an exemplary utility computing environment in which embodiments of the present invention can be implemented.

With reference now to FIG. 2, an exemplary provisionable network in which embodiments of the present invention can function is shown. Provisionable network, or utility computing environment (UCE), 200 is shown bounded by a security boundary 250, in one embodiment, security boundary 250 is a virtual boundary. Boundary 250 is shown here only to he illuminate the concepts presented herein. Typical UCE 200comprises an operations center local area network (LAN) 205, a data center utility controller LAN 201 and resource pools 206. It is noted here that, by their very nature, UCEs are flexible in their composition, comprising any number and type of devices and systems. It is this flexibility from which they derive their usefulness. The specific architecture illustrated in FIG. 2, therefore, is not meant to limit the application of embodiments of the present invention to any particular provisionable network architecture.

Typical UCE 200, in this illustration, communicates with the outside world via the Internet 220 and virtual public networks (VPNs) in the Internet. The communications links that enable this communication are protected by firewall 210. Firewall 210 is shown to illustrate a concept and is not meant to imply any particular method or system of intrusion protection. Many types of hardware and software firewalls are well known in the art and firewall 210 may be either or both.

It is noted here that communications into and out of a provisionable network, as in any network, is accomplished through ports such as illustrated at 281. Communications between devices within a network are also conducted through ports, as alluded to at 282. It is noted that ports are not necessarily physically located at the periphery of a network but are logical end points. External ports 281 and intra-network ports 282 are shown only to help illustrate the concepts presented in embodiments of the present invention. It is also noted that virtual security boundary 250 does not exist in a physical sense. Resources included in the servers and LANs comprising utility computing environment 200 may include devices and servers located remotely from the other elements of the UCE.

As shown in FIG. 2, operations center (OC) LAN 205 comprises an internal trust domain. Included in OC LAN 205 are open view servers 209, network intrusion detection system (NIDS) 212 and NIDS manager 211. It is noted that, though NIDS 212, NIDS manager 211 are illustrated as computer-like devices, their physical existence is not limited to a particular device. Each may exist as a standalone device or implemented as software resident in a physical device or server.

The heart of the exemplary utility computing environment illustrated in FIG. 2 is the data center utility controller (UC) LAN, 201. This LAN represents another, higher, internal trust domain. UC LAN communicates through OC LAN 205 and is typically separated from it by various forms of firewalls 202. UC LAN 201 can comprise various numbers of resource managers, such as illustrated at 203. The flexibility inherent in the UCE concept can result in many combinations of resources and resource managers. Resource managers 203 are the typical interface with the various pools of resources 206, communicating with them through ports and some sort of switching network as indicated by the tier 1 switch at 208.

Resource pools 206 are limitlessly flexible, comprising any conceivable combination of data servers, computational capability, load balancing servers or any other device or capability imaginable. Because the possible varieties of resources that can be included in resource pools 206, they are separated from UC LAN 201 by firewalls 204, which, like UC firewalls 202, can be software or hardware or both, in many combinations.

It is noted that embodiments of the present invention can run in many different environments. One network management environment in which an embodiment operates serves as an end-to-end service management infrastructure and is particularly well suited to managing a provisionable network which is known as a utility data center (UDC).

In one embodiment, the UCE maintains a list of each individual network device and the attributes of the device. For example, the attributes of a device may include, but are not limited to, the make, model, type, role, and unique identifier of the device. Additionally, the UCE may list each individual connection that will connect the network devices, and the attributes of those connections, such as, but not limited to, the unique identifier of the source device, the unique identifier of the destination device, the identifier of the source device's port, into which the cable is inserted, the identifier of destination device's port, into which the cable is inserted, and the type of cable used in the connection. For example, the cable may be, but is not limited to, a power cable, serial cable, Ethernet cable, fibre channel cable, or SCSI cable.

Figure 3:
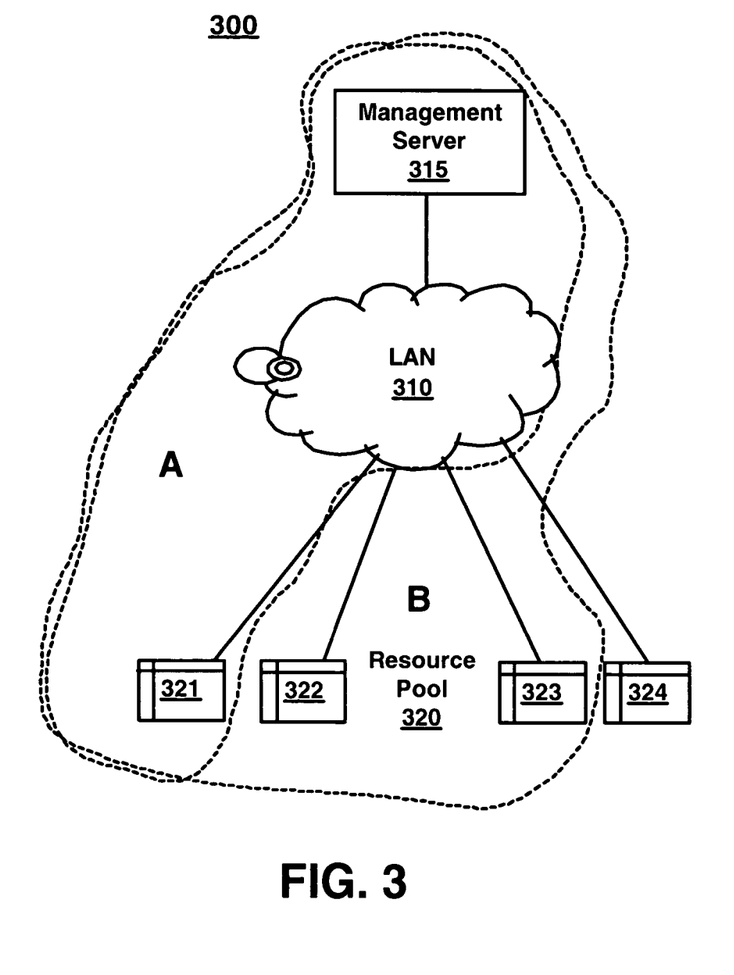
FIG. 3 is a block diagram of an exemplary portion of a utility computing environment for automated asymmetric key security credential distribution in accordance with one embodiment of the present invention.

With reference now to FIG. 3, a block diagram of an exemplary portion of a utility computing environment for automated asymmetric key security credential distribution is shown in accordance with one embodiment of the present invention. In one embodiment, network 300 includes a management server 315 and a local area network (LAN) 310. LAN 310 can include elements such as racks, routers, cables, switches and other elements that are well known in the art. Network 300 also includes a plurality of resources (e.g., resources 321-324) in a resource pool 320. In one embodiment, resource pool 320 may include servers, disk arrays, and the like. In one embodiment, the resources in resource pool 320 are in virtual farms (e.g., VLAN A and VLAN B).

In one embodiment, LAN 310 includes a number of connections coupled to a number of computing devices 321-324 (e.g., resource pool 320) in a similar fashion to that of FIG. 1. Typically, the computing devices 321-324 are connected with the LAN 310 using cables or the like. However, wireless connections between the computing devices 321-324 and LAN 310 are also contemplated.

In one embodiment, the connections are connected to switches such as the switches 111-116 of FIG. 1. In general, the switches are capable of being programmed or configured such that LAN 310 is logically separated into a number of VLANs or farms. The programming or configuring of these switches can be changed, thereby changing the resources allocated to the various VLANs. For example, by changing the configuration of a switch, computer system 321 can be "virtually moved" from one VLAN (e.g., VLAN A) to another VLAN (e.g., VLAN B). The allocation and reallocation of resources between VLANs is dynamic and is one of the valuable operations performed after the actual physical building of the network structure in a utility computing environment.

In addition to computer systems and switches, LAN 310 can include other types of devices such as, but not limited to, routers, load balancers, firewalls, and hubs. These other types of devices may also be programmable or configurable.

Operation

Figure 4:
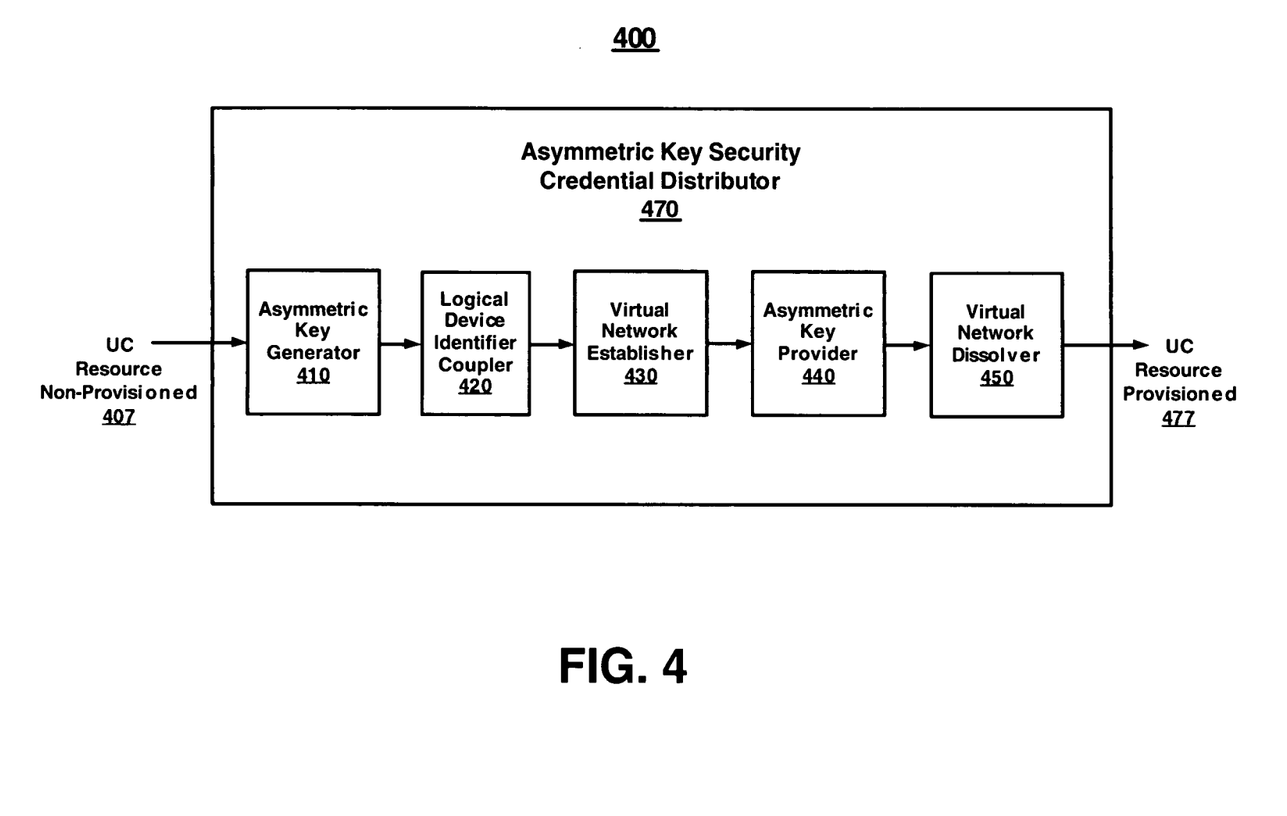
FIG. 4 is a block diagram of an exemplary automated asymmetric key security credential distributor in accordance with one embodiment of the present invention.

With reference now to FIG. 4, a block diagram of an exemplary automated asymmetric key security credential distributor is shown in accordance with one embodiment of the present invention. In one embodiment, the asymmetric key security credential distributor 470 includes an asymmetric key generator 410, a logical device identifier 420, a virtual network establisher 430, an asymmetric key provider 440 and a virtual network dissolver 450.

In general, the asymmetric key generator 410 generates the asymmetric key (e.g., the public-private key pair) for the resource (e.g., resource 321) at the management server 315, the logical device identifier 420 is utilized to receive the logical device identifier of the resource (e.g., 321) at the management server 315, the virtual network establisher 430 is used to establish the isolated virtual network (or VLAN) between the management server 315 and the resource (e.g., 321), the asymmetric key provider 440 is used to provide the asymmetric key to the resource (e.g., 321) from the management server 315, and the virtual network dissolver 450 is used to dissolve the isolated virtual network (or VLAN) between the management server 315 and the resource (e.g., 321). Further operation of each of the components is provided in more detail herein.

In general, asymmetric key security credential distributor 470 provides an automated method for securely distributing an asymmetric key (e.g., a public- private key pair) to the managed nodes in a utility computing environment such as the UDC of FIG. 2. Embodiments further provide a framework that is utilized for the secure setup of other infrastructure authentication and shared credential schemes at any time during the lifetime of a managed node resource, while the resource continues to maintain its present logical allocation/provisioning context. Embodiments also provide identity and credential management issues related to utility computing features such as snapshot (e.g., VLAN duplication) or replacing failed devices.

In one embodiment, utility computing environment resource provisioning is performed in a phased manner. Initially resources and disks are allocated, then disk binding to resources (SAN setup), resource wiring (network VLAN setup), and finally configuring resources for domain name system (DNS), dynamic host configuration protocol (DHCP), and other services that are later utilized to manage the resource. The resource wiring phase not only includes setting up of the resource network but also the setup of a management interface onto every managed resource subnet, via which the management server (e.g. 315 of FIG. 3) can provision and manage the resources (e.g., resources 321-324 of FIG. 3). In one embodiment, this also includes setting up of a perimeter defense for that management server interface, including in one embodiment, subnet level anti-spoofing at the internet protocol (IP) layer.

Figure 5:
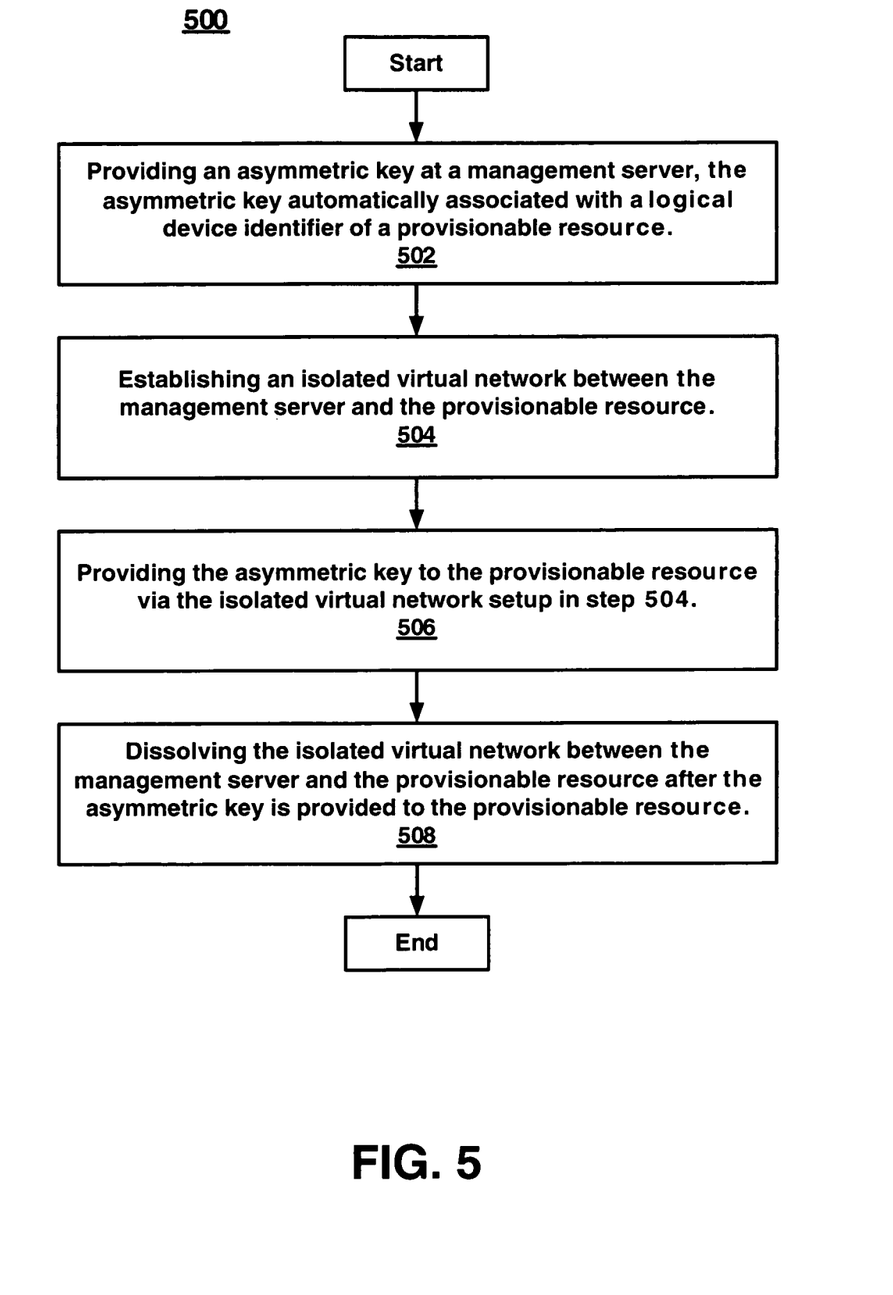
FIG. 5 is a flowchart of a method for automatic, secure, and confidential distribution of an asymmetric key security credential in a utility computing environment in accordance with one embodiment of the present invention.

Referring now to FIG. 5, a flowchart of a method for automatic, secure, and confidential distribution of an asymmetric key security credential in a utility computing environment is shown in accordance with one embodiment of the present invention. One embodiment of the automatic, secure, and confidential distribution of the asymmetric key security credential utilizes a new phase in the lifecycle of the utility computing environment after the wiring phase but before the resource is fully provisioned to the user. In another embodiment, the wiring phase is modified to include the automatic, secure, and confidential distribution of the asymmetric key security credential.

With reference now to step 502 of FIG. 5, and to FIG. 3, one embodiment provides an asymmetric key at a management server 315, wherein the asymmetric key is associated with a provisionable resource (e.g., 321-324). In one embodiment, the asymmetric key generator 410 of FIG. 4 generates the asymmetric key. As stated herein, the asymmetric key is a public-private key pair. In general, the public key is signed by the management server 315 to generate a certificate for the resource pool that is being distributed. In one embodiment, the certificate is created with several attributes depending upon the environment requirements (e.g., IP address in a non DHCP environment, DNS names, and the like). In another embodiment, the certificate is tied only to attributes that have context information for the particular resource allocation, such as the logical device identifier for the resource.

In one embodiment, the asymmetric key pair is stored on the management server 315 in a database record (e.g., an available repository) for efficient access by the management server 315 when communicating with the managed resource (e.g., 321-324). In another embodiment, only the private key is stored on the management server 315 in a database record. Moreover, in one embodiment, the asymmetric private key is encrypted when it is stored. In another embodiment, when a resource is re-provisioned (e.g., when the entire farm or portions of the farm are dissolved), the record attribute entry for the asymmetric key pair located on the management server 315 is deleted.

As stated herein, the asymmetric key pair, in one embodiment, is associated with a logical device identifier of a provisionable resource (e.g., 321-324). That is, a unique identity is associated with the asymmetric key pair. For example, the logical device identifier 420 of FIG. 4 is utilized to identify a physical resource being referred to, e.g., a resource which is allocated to a logical farm (e.g., virtual infrastructure), to a particular resource device's allocation and position within the farm topology or to a combination thereof. Once the unique identifier is selected, a credential key is generated. For example, the public key of the resource (e.g., 321) is signed by the management server 315 private key to generate a certificate for the resource (or pool of resources) that is being distributed. Thus, the certificate can be used for both context and validation of the managed resource 321 defined by the logical device identifier.

In general, the logical device identifier is unique at any given time, including when the resource(s) are idled or in standby. Therefore, the logical device identifier is always associated with the actual resource, not images, or the like. In another embodiment, other managed resource attributes, such as IP address, DNS name, etc., may be used to identify the resource(s).

With reference now to step 504 of FIG. 5, and to FIG. 3, one embodiment establishes an isolated virtual network (e.g., virtual network A or B) between the management server 315 and the provisionable resource (e.g., 321-324). In other words, a temporary secure environment is setup for asymmetric key (e.g., credential) distribution. In one embodiment, the virtual network establisher 430 of FIG. 4 is used to establish the isolated virtual network (or VLAN). For example, a specific resource (e.g., resource 321 of VLAN B) to which the asymmetric key will be distributed, is temporarily rewired into a separate VLAN (or subnet) A, such that the resource 321 does not have any other interface on another VLAN (or subnet). The management server 315 distributing the credential is also temporarily initialized with a virtual interface on VLAN A. In one embodiment, the VLAN A utilizes subnet level anti-spoofing rules to ensure that communication from any other VLAN or subnet cannot spoof a resource on the temporary VLAN A.

Referring now to step 506 of FIG. 5 and to FIG. 3, one embodiment provides the asymmetric key pair (along with the certificate for the public key) to the provisionable resource. In one embodiment, the asymmetric key provider 440 of FIG. 4 is used to provide the asymmetric key. For example, the public-private key pair is then distributed by the management server 315 to the managed resource 321 and installed on the managed resource 321 over the temporary VLAN A. In one embodiment, the credential (e.g., public-private key pair) along with a certificate is distributed by the management server 315 and installed onto the managed resource 321. In another embodiment, the management server 315 retains a copy of both the public key and the private key pair of the managed resource 321 incase the key pair is lost by the managed resource 321, or the managed resource 321 is replaced, or the like.

With reference now to step 508 of FIG. 5 and to FIG. 3, one embodiment dissolves the isolated virtual network (e.g., VLAN A) between the management server 315 and the provisionable resource after the asymmetric key pair is provided to the provisionable resource. In one embodiment, the virtual network dissolver 450 of FIG. 4 is used to dissolve the isolated virtual network (or VLAN). For example, the temporary isolated secure environment (e.g., VLAN A) is reset. In one embodiment, this includes tearing down the temporary VLAN A (or subnet) and management interface setup, and resetting the managed resource 321 to its original configuration (e.g., VLAN B). Thus, the resource 321 now has a public-private key pair and a certificate for the public key signed by the management server 315 for purposes of authentication.

Therefore, in operation, the managed resource (e.g., 321) and the management server 315 no longer need to provide call-outs or have the management server 315 respond to every authentication request. Instead, the managed resource 321 will have the management server's trusted public key and validate other devices based on the certificate initially provided by the management server 315 or the other contacting resource (e.g., 322-324). For example, in one embodiment, when another device 322 contacts the managed resource 321, the managed resource 321 will validate the certificate provided by the contacting device 322 by checking the digital signature of the certificate (to verify that it is truly signed by the management server). Moreover, in one embodiment, the managed resource 321 will also check a certificate revocation list to ensure that the certificate from device 322 has not been revoked, compromised, or the like.

In so doing, an authentication credential is established. For example, as described herein, a second device 322 receiving an encrypted message from a first device 321 will utilize the first device's 321 public key to decrypt the message. The second device 322 will then respond with confidential information (possibly including the public-key of the second device 322 and any type of certificate) encrypted in the first device's 321 public key which can only be decrypted by the private key of the first device 321. Therefore, the second device 322 ensures that it is only communicating with the first device 321. After the initial handshake (e.g., the public key private key decryption process described above), the first device 321 and second device 322 may, in one embodiment, swap symmetric keys (e.g., passwords or other encryption credentials) for utilization in later authentication purposes.

Although examples have shown the ability to setup trust for proprietary application authentication frameworks, embodiments also provide the capability of utilization by other applications that have their own authentication schemes or frameworks but do not have a mechanism to distribute them. For example, to distribute any type of authentication credentials (e.g., public-private key pair, shared secret, and the like) the management server 315 will retrieve the public key associated with the logical device identifier (or device credential) from the repository described herein. The management server 315 will then encrypt the new application credentials to be distributed via the public key of the managed device (e.g., resource 321), such that when the new application credentials are distributed to the managed node 321, only the managed node 321 having the private key will be able to decrypt the new application credentials. Thus, the main infrastructure credentials can be used at any time during the lifetime of the managed resource to distribute authentication and shared credentials securely from the management server 315 to the managed nodes (e.g., resources 321-324).

Moreover, in similar fashion, the infrastructure credentials can be leveraged to re-key themselves and then be distributed securely to the managed nodes. Re-keying is important, as the strength of a credential is tied to the time for which it is used. A key that is used for an extended period of time is considered to have a higher risk of being cracked/compromised, than a key that is used for a shorter duration of time. Thus, by ensuring that the main infrastructure credentials can be used at any time during the lifetime of the managed resource to distribute authentication and shared credentials securely from the management server 315 to the managed nodes (e.g., resources 321-324).

In one embodiment, when the physical resource (e.g., resource 321) is reallocated in a different context (e.g., reassigned, taken offline, or the like) the logical device identifier will change and the validity of the credentials (or certificate) associated with the old logical device identifier is lost and/or placed on the certificate revocation list. In another embodiment, when a physical resource is replaced with another physical computing resource (e.g., due to failure, maintenance, or the like) while retaining the context, then even though the physical device identifier of the managed resources changes, the logical device identifier does not change. Therefore, the validity of the asymmetric key and/or certificate associated with the logical device identifier is not lost.

The context validity is also utilized when the image of an existing resource (e.g., 321) is snapshotted (e.g., disc copied) and used for another resource (e.g., 322) without the asymmetric key being deleted (by oversight, or other reasons). In that case, although the new resource 322 might have the utility computing base credentials of the original resource 321, the new resource 322 would not be able to leverage the base credentials for authentication. That is, the validity of the asymmetric key is not just dependent on standard public-private key logical validity checks. It also incorporates the logical device identifier in the verification framework. In another embodiment, during the snapshot process, both resources (e.g., resources 321 and 322) will be re-keyed and the certificates revoked to provide another layer of security.

In another embodiment, once the asymmetric key is established between the management server 315 and the provisioned resources 321-324, the management server 315 will then act as a proxy between the resources for purposes of verification and security. For example, if resource 324 needs to interact with resource 321, resource 324 will contact management server 315, be verified as resource 324 by the management server 315, and provide a credential for the management server 315 to pass to resource 321. This communication of the credential will happen between resource 324 and the management server 315 by encrypting it with the public key of the management server 315, such that only management server 315 can decrypt it using its private key.

The encrypted data will also be signed with the private key of resource 324, so that the management server 315 can authenticate the communication using the public key of resource 324. Resource manager 315 will then contact and verify resource 321 and pass the credential received from resource 324 to resource 321. This communication of the credential will happen between resource 321 and the management server 315 by encrypting it with the public key associated with logical device id of resource 321, such that only resource 321 can decrypt it using its private key.

The encrypted data will also be signed with the private key of management server 315, so that the resource 321 can authenticate the communication using the public key of management server 315. In so doing, the resources 321 and 324 will be able to verify their interaction with one another utilizing the new credential (e.g., a shared secret, public-private key pair, cryptographic key, or the like) in a real-time secure manner, based on their logical usage context at that time. The basis of this being more secure than just validating each others certificate directly, is that the credentials passed are implicitly validated by the management server, whom both the resources trust (for checking that the logical ID context is still true for both the resources in real time), and the credentials are always transmitted in an encrypted confidential manner.

In another similar embodiment, the mechanism described in the above paragraph can be used to setup any type of shared encryption credential (such as a shared secret key) between any two provisionable resources in a secure confidential manner, which could be then used by those resources to communicate securely with each other.

Thus, embodiments of the present invention provide methods and systems for automatic, secure, and confidential distribution of an asymmetric key security credential in a utility computing environment. Furthermore, embodiments provide a method of provisioning an asymmetric key in a secure and automated manner from the management server to any of the resources in the utility computing environment. Embodiments also provide a framework wherein the asymmetric key is used for provisioning any new credentials or for the resource being authenticated by another resource. Embodiments further provide support for utility computing environment features such as snapshot, VLAN duplication, and the like.

Embodiments of the present invention are thus described. While the present invention has been described in particular embodiments, it should be appreciated that the present invention should not be construed as limited by such embodiments, but rather construed according to the following claims.

I claim:

1. A method for automatic, secure, and confidential distribution of an asymmetric key security credential in a utility computing environment (UCE) comprising:
providing an asymmetric key at a management server, said asymmetric key automatically associated with a logical device identifier of a provisionable resource capable of being provisioned by the UCE;
establishing an isolated asymmetric key security credential distribution virtual network only between the management server and the provisionable resource for said distribution of said asymmetric key security credential;
providing the asymmetric key from the management server to the provisionable resource within the isolated asymmetric key security credential distribution virtual network without requiring the provisionable resource to request the asymmetric key; and
dissolving the isolated asymmetric key security credential distribution virtual network only between the management server and the provisionable resource after the asymmetric key is provided to said provisionable resource within the isolated asymmetric key security credential distribution virtual network, wherein the providing of the asymmetric key at the management server, the establishing, the providing of the asymmetric key from the management server, and the dissolving are performed prior to provisioning the provisionable resource to a user;
wherein said asymmetric key is a public-private key pair.

2. The method of claim 1 further comprising:
re-keying the asymmetric key during a provisionable resource duplication process for each device involved in said provisionable resource duplication process.

3. The method of claim 1 further comprising:
providing a record entry on a database of said management server when said provisionable resource is assigned an asymmetric key.

4. The method of claim 3 further comprising:
deleting a record entry on an asymmetric database of said management server when said provisionable resource is re-allocated.

5. The method of claim 1 wherein said logical device identifier identifies a single provisionable resource, based on its logical identity, rather than physical identity.

6. The method of claim 1 wherein said logical device identifier identifies a group of provisionable resources, based on their logical identity, rather than physical identities.

7. The method of claim 1 wherein after said provisionable resource has received said asymmetric key, said method further comprises:
receiving an authentication credential at the management server from a first provisionable resource; and
providing said authentication credential from the management server to a second provisionable resource, wherein said management server securely provides said authentication credential to said second provisionable resource automatically.

8. The method of claim 1 wherein after said provisionable resource has received said asymmetric key, said management server provides an authentication service to said provisionable resource, for authenticating a second provisionable resource, based on their logical identity.

9. The method of claim 1 wherein after said provisionable resource has received said asymmetric key, said method further comprises:
receiving a shared encryption at the management server credential o a first provisionable resource; and
providing said shared encryption credential from the management server to a second provisionable resource, wherein said management server securely provides said shared encryption credential to said second provisionable resource automatically.

10. An automated asymmetric key security credential distributor system for a utility computing environment (UCE) comprising:
an asymmetric key generator for generating an asymmetric key, wherein the asymmetric key is stored at a management server;
a logical device identifier coupler for coupling the asymmetric key with a logical device identifier of a provisionable resource capable of being provisioned by the UCE;
an isolated asymmetric key security credential distribution virtual network establisher for automatically establishing an isolated asymmetric key security credential distribution virtual network only between the management server and the provisionable resource;
an asymmetric key provider for providing the asymmetric key from the management server to the provisionable resource within the isolated asymmetric key security credential distribution virtual network without requiring the provisionable resource to request the asymmetric key; and
a virtual network dissolver for dissolving the isolated asymmetric key security credential distribution virtual network only between the management server and the provisionable resource after the asymmetric key is provided to said provisionable resource within the isolated asymmetric key security credential distribution virtual network, wherein the generator, the coupler, the establisher, the provider and the dissolver execute prior to provisioning the provisionable resource to a user.

11. The automated asymmetric key distributor system of claim 10 further comprising:
a database on said management server for maintaining a record entry when said provisionable resource is assigned an asymmetric key.

12. The automated asymmetric key distributor system of claim 11 further comprising:
a database cleaner on said management server for deleting a record entry when said provisionable resource is re-allocated.

13. The automated asymmetric key distributor system of claim 10 wherein said logical device identifier identifies a single provisionable resource, based on its logical identity, rather than physical identity.

14. The automated asymmetric key distributor system of claim 10 wherein said logical device identifier identifies a group of provisionable resources, based on their logical identity, rather than physical identities.

15. The automated asymmetric key distributor system of claim 10 wherein after said provisionable resource has received said asymmetric key, said automated asymmetric key distributor further comprises:
an authentication credential receiver associated with said management server for receiving a credential from a first provisionable resource; and
an authentication credential provider associated with said management server for providing said authentication credential to a second provisionable resource, wherein said management server automatically and securely provides said credential to said second provisionable resource.

16. The automated asymmetric key distributor system of claim 10 wherein after said provisionable resource has received said asymmetric key, said management server is configured to provide an authentication service to said provisionable resource, for authenticating a second provisionable resource, based on their logical identity.

17. The automated asymmetric key distributor system of claim 10 wherein after said provisionable resource has received said asymmetric key, said automated asymmetric key distributor further comprises:
a shared encryption credential receiver associated with the management server for receiving a shared encryption credential from a first provisionable resource; and
a shared encryption credential provider associated with the management server for providing said shared encryption credential to a second provisionable resource, wherein said management server automatically and securely provides said shared encryption credential to said second provisionable resource.

18. A non-transitory computer-usable medium having computer-readable program code embodied therein for causing a method for automatic, secure, and confidential distribution of an asymmetric key security credential in a utility computing environment (UCE) comprising:
establishing an asymmetric key at a management server;
associating the asymmetric key with a logical device identifier of a provisionable resource capable of being provisioned by the UCE;
automatically establishing an isolated asymmetric key security credential distribution virtual network only between the management server and the provisionable resource;
providing the asymmetric key from the management server to the provisionable resource within the isolated asymmetric key security credential distribution virtual network without requiring the provisionable resource to request the provisionable resource; and
dissolving the isolated asymmetric key security credential distribution virtual network only between the management server and the provisionable resource after the asymmetric key is provided to said provisionable resource within the isolated asymmetric key security credential distribution virtual network, wherein the establishing of the asymmetric key, the associating, the automatically establishing of the isolated asymmetric key security credential distribution virtual network, the providing and the dissolving are performed prior to provisioning the provisionable resource to a user.

19. The computer-usable medium of claim 18 further comprising:
re-keying the asymmetric key during a provisionable resource duplication process for each device involved in said provisional resource duplication process.

20. The computer-usable medium of claim 18 further comprising:
providing a record entry on an asymmetric database of said management server when said provisionable resource is assigned an asymmetric key.

21. The computer-usable medium of claim 20 further comprising:
deleting a record entry on said asymmetric database of said management server when said provisionable resource is re-allocated.

22. The computer-usable medium of claim 18 wherein said asymmetric key is a public-private key pair.

23. The computer-usable medium of claim 18 wherein said logical device identifier identifies a single provisionable resource, based on its logical identity, rather than physical identity.

24. The computer-usable medium of claim 18 wherein said logical device identifier identifies a group of provisionable resources, based on their logical identity, rather than physical identities.

25. The computer-usable medium of claim 18 wherein after said provisionable resource has received said asymmetric key, said computer-usable medium and program code embodied therein further causes:
receiving an authentication credential at the management server from a first provisionable resource; and
providing said authentication credential from the management server to a second provisionable resource, wherein said management server securely provides said authentication credential to said second provisionable resource automatically.

26. The computer-usable medium of claim 18 wherein after said provisionable resource has received said asymmetric key, said management server provides an authentication service to said provisionable resource, for authenticating a second provisionable resource, based on their logical identity.

27. The computer-usable medium of claim 18 wherein after said provisionable resource has received said asymmetric key, said computer-usable medium and program code embodied therein further causes:
   receiving a shared encryption credential at the management server from a first provisionable resource; and
   providing said shared encryption credential from the management server to a second provisionable resource, wherein said management server securely provides said shared encryption credential to said second provisionable resource automatically.

28. A utility computing environment comprising:
   a plurality of information technology (IT) compute resources and connections coupled with said plurality of IT compute resources; with each of said plurality of IT compute resources represented in a machine-readable map;
   a management server coupled with said plurality of IT compute resources, said management server configured to automatically distribute asymmetric key security credentials for said IT compute resources within a data center;
   an asymmetric key generator for generating an asymmetric key at said management server;
   a logical device identifier coupler for coupling the asymmetric key with a logical device identifier of a provisionable resource of the plurality of IT compute resources capable of being provisioned by the UCE;
   an isolated asymmetric key security credential distribution virtual network establisher for automatically establishing an isolated asymmetric key security credential distribution virtual network only between the management server and the provisionable resource;
   an asymmetric key provider for providing the asymmetric key from the management server to the provisionable resource within the isolated asymmetric key security credential distribution virtual network without requiring the provisionable resource to request the asymmetric key; and
   a virtual network dissolver for dissolving the isolated asymmetric key security credential distribution virtual network only between the management server and the provisionable resource after the asymmetric key is provided to said provisionable resource within the isolated asymmetric key security credential distribution virtual network, wherein the generator, the coupler, the establisher, the provider and the dissolver execute prior to provisioning the provisionable resource to a user.

29. The utility computing environment of claim 28 further comprising:
   a utility controller for automatically configuring and deploying a pool of said IT compute resources into farms using said machine-readable map as a specification.

30. The utility computing environment of claim 28 further comprising:
   a network operations center from which a data center operator can operate.

* * * * *

UNITED STATES PATENT AND TRADEMARK OFFICE
CERTIFICATE OF CORRECTION

| | | |
|---|---|---|
| PATENT NO. | : 8,577,044 B2 | |
| APPLICATION NO. | : 11/262131 | |
| DATED | : November 5, 2013 | |
| INVENTOR(S) | : Amit Raikar | |

It is certified that error appears in the above-identified patent and that said Letters Patent is hereby corrected as shown below:

In the Claims
In column 12, line 50, in Claim 9, delete "o a" and insert -- from a --, therefor.

Signed and Sealed this
Eighteenth Day of February, 2014

Michelle K. Lee
*Deputy Director of the United States Patent and Trademark Office*